(12) United States Patent
Petrovic

(10) Patent No.: US 9,777,653 B2
(45) Date of Patent: Oct. 3, 2017

(54) METHOD FOR CONTROLLING A TURBOCHARGER ARRANGEMENT OF AN INTERNAL COMBUSTION ENGINE, AND CONTROL DEVICE

(75) Inventor: Simon Petrovic, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 735 days.

(21) Appl. No.: 13/536,938

(22) Filed: Jun. 28, 2012

(65) Prior Publication Data
US 2013/0006494 A1    Jan. 3, 2013

(30) Foreign Application Priority Data

Jun. 29, 2011 (DE) ........................ 10 2011 078 282

(51) Int. Cl.
| F02D 41/02 | (2006.01) |
| F02D 23/00 | (2006.01) |
| F02D 41/00 | (2006.01) |
| F02B 37/00 | (2006.01) |
| F02B 37/013 | (2006.01) |
| F02B 37/18 | (2006.01) |
| F02B 37/12 | (2006.01) |

(52) U.S. Cl.
CPC .......... *F02D 41/024* (2013.01); *F02B 37/004* (2013.01); *F02B 37/013* (2013.01); *F02B 37/127* (2013.01); *F02B 37/18* (2013.01); *F02D 23/00* (2013.01); *F02D 41/0007* (2013.01); *Y02T 10/144* (2013.01); *Y02T 10/26* (2013.01)

(58) Field of Classification Search
CPC ...... Y02T 10/144; F02B 37/18; F02B 37/013; F02B 37/004; F02B 37/025

USPC .......... 60/612; 701/102; 123/568.11–568.32
See application file for complete search history.

(56) References Cited

U.S. PATENT DOCUMENTS

| 7,322,194 B2 | 1/2008 | Sun et al. |
| 7,607,302 B2 * | 10/2009 | Fry ........................ F02B 37/013 60/602 |
| 8,312,718 B2 | 11/2012 | Sun et al. |

(Continued)

FOREIGN PATENT DOCUMENTS

CN            101925725 A        12/2010

OTHER PUBLICATIONS

Partial Translation of Office Action of Chinese Application No. 201210219366.9, Issued Oct. 9, 2015, State Intellectual Property Office of PRC, 12 Pages.

*Primary Examiner* — Sizo Vilakazi
(74) *Attorney, Agent, or Firm* — Julia Voutyras; McCoy Russell LLP

(57) ABSTRACT

Embodiments for controlling exhaust gas turbines are provided. In one embodiment, a method for controlling a turbocharger arrangement of an internal combustion engine, the turbocharger arrangement having at least a first exhaust-gas turbine and a second exhaust-gas turbine arranged downstream of the first, and an exhaust-gas aftertreatment system being arranged downstream of the second exhaust-gas turbine comprises, in a warm-up mode, controlling at least one exhaust-gas turbine so as to increase an inlet temperature of an exhaust-gas flow at the inlet into the exhaust-gas aftertreatment system. In this way, the exhaust-gas aftertreatment system may be rapidly heated.

16 Claims, 2 Drawing Sheets

(56) References Cited

U.S. PATENT DOCUMENTS

| | | | | |
|---|---|---|---|---|
| 8,468,800 B2* | 6/2013 | Hatamura | ............. | F01N 13/011 123/568.11 |
| 2003/0074899 A1* | 4/2003 | Yamaguchi | ........... | F01N 3/2006 60/612 |
| 2004/0144340 A1* | 7/2004 | Kilger | .................... | F01P 7/164 123/41.1 |
| 2006/0059910 A1* | 3/2006 | Spaeder | ................. | F01N 3/101 60/612 |
| 2006/0070381 A1* | 4/2006 | Parlow | ................... | F02B 37/00 60/612 |
| 2007/0283698 A1* | 12/2007 | Chen | ................... | F02M 25/071 60/605.1 |
| 2009/0265080 A1 | 10/2009 | Fry et al. | | |
| 2011/0061381 A1* | 3/2011 | Harris | .................. | F02B 37/013 60/612 |

* cited by examiner

METHOD FOR CONTROLLING A TURBOCHARGER ARRANGEMENT OF AN INTERNAL COMBUSTION ENGINE, AND CONTROL DEVICE

RELATED APPLICATIONS

The present application claims priority to German Patent Application Number 102011078282.6, filed on Jun. 29, 2011, the entire contents of which are hereby incorporated by reference for all purposes.

FIELD

The disclosure relates to a method for controlling a turbocharger arrangement of an internal combustion engine and a control device for a turbocharger arrangement of an internal combustion engine.

BACKGROUND AND SUMMARY

Internal combustion engines, in particular diesel and applied-ignition engines, are increasingly being provided with turbochargers. A turbocharger serves for compressing the air supplied to the engine, whereby an increase in performance can be attained. Conversely, a predefined power can be attained by means of a supercharged engine of smaller swept volume, as a result of which it is possible to attain a smaller and more lightweight design and a drive which is more economical in terms of fuel consumption. Such turbochargers are generally driven by the exhaust-gas flow of the internal combustion engine. For this purpose, the turbocharger has a turbine which is arranged in the exhaust-gas flow. The turbine drives, in particular via a common shaft, a compressor which compresses the charge air of the engine.

A greater increase in performance and a higher specific power of the internal combustion engine can be attained through the use of two turbochargers in an internal combustion engine. The two turbines may in this case be arranged in series in the exhaust-gas flow of the internal combustion engine, such that one of the two turbines operates in a region of relatively high pressure and is referred to as a high-pressure turbine, whereas the other turbine operates in the region of relatively low pressure and is referred to as a low-pressure turbine. It is likewise possible for the two compressors to be arranged in series in the charge-air flow. Through the use of a multiplicity of turbochargers in an internal combustion engine, it is also possible to attain an improved throttle pedal response behavior.

A turbocharger arrangement with a multiplicity of turbochargers furthermore offers advantages with regard to exhaust-gas recirculation, since the high-pressure turbine generates a higher exhaust-gas back pressure which permits increased exhaust-gas recirculation; in this way it is possible in particular to attain a reduction in pollutant discharge. Owing to the ever more stringent limit values for the admissible pollutant emissions of motor vehicles, exhaust-gas aftertreatment also plays an ever increasing role. An exhaust-gas aftertreatment system serves in particular to reduce the emissions of nitrogen oxides ($NO_x$), hydrocarbons (HC) and carbon monoxide (CO), and may comprise one or more catalytic converters, for example an oxidation catalytic converter for the reduction of HC and CO, or else LNT (Lean $NO_x$ Trap) catalytic converters for the reduction of HC and CO and for the conversion of $NO_x$ into $N_2$ and $O_2$. Here, measures may also be taken for reducing the soot content of the exhaust gas. Exhaust-gas aftertreatment systems are generally arranged downstream of the low-pressure exhaust-gas turbine.

For the function of an exhaust-gas aftertreatment system, the inlet temperature, that is to say the temperature of the exhaust gas before or as it enters the exhaust-gas aftertreatment system, should lie within a predetermined range. In particular, for adequate functioning of the exhaust-gas aftertreatment system, the exhaust gases should have a minimum inlet temperature. Since said minimum temperature cannot be ensured at all times, known measures for increasing the inlet temperature include the injection of additional fuel, in particular by means of a post-injection, or throttling the engine. Said measures however lead to an undesired increase in fuel consumption.

The inventors herein have recognized the above issues and provide an approach to at least partly address them. In one example, a method for controlling a turbocharger arrangement of an internal combustion engine, the turbocharger arrangement having at least a first exhaust-gas turbine and a second exhaust-gas turbine arranged downstream of the first, and an exhaust-gas aftertreatment system being arranged downstream of the second exhaust-gas turbine comprises, in a warm-up mode, controlling at least one exhaust-gas turbine so as to increase an inlet temperature of an exhaust-gas flow at the inlet into the exhaust-gas aftertreatment system.

In this way, the exhaust-gas aftertreatment system may be heated by controlling an exhaust gas turbine. In one example, during the warm-up mode, the second exhaust gas turbine may include a bypass valve that is controlled based on exhaust-gas aftertreatment system or engine temperature, while the first exhaust gas turbine may include a bypass valve that is controlled based on engine speed and load, in order to deliver a desired amount of boost pressure. By controlling one turbine bypass valve to provide desired boost pressure and another turbine bypass valve to route heated exhaust directly to the exhaust-gas aftertreatment system, rapid heating of the exhaust-gas aftertreatment system may be achieved without utilizing post-injection or other mechanisms that degrade fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
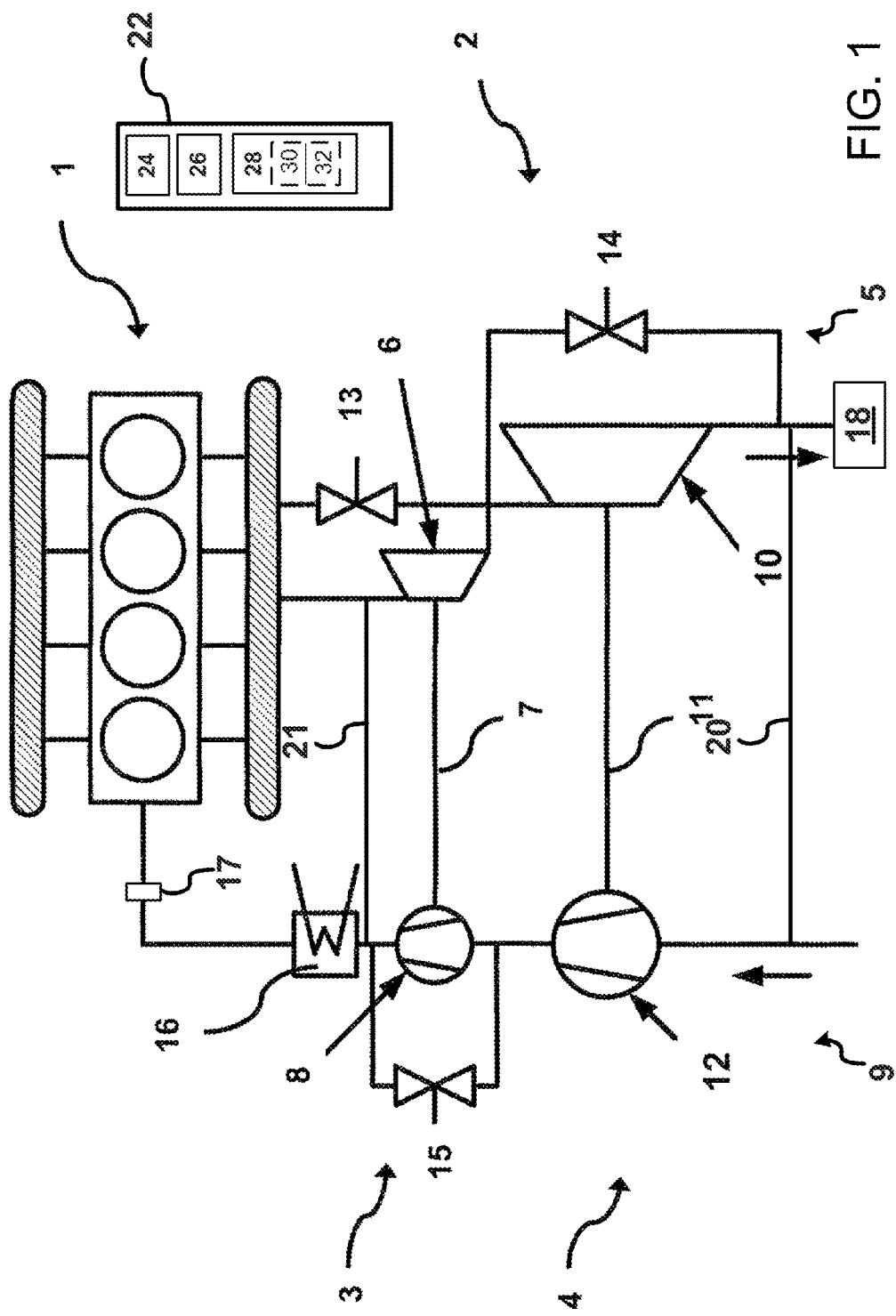
FIG. 1 shows a simplified block circuit diagram of an internal combustion engine having a turbocharger arrangement.

A method according to the disclosure for controlling a turbocharger arrangement of an internal combustion engine relates to a turbocharger arrangement which comprises at least one first exhaust-gas turbine and at least one second exhaust-gas turbine, wherein the second exhaust-gas turbine is arranged downstream of the first, that is to say is positioned downstream in the exhaust-gas flow of the first. The first exhaust-gas turbine is thus formed in particular as a high-pressure exhaust-gas turbine, and the second is formed as a low-pressure exhaust-gas turbine. Furthermore, an exhaust-gas aftertreatment system is provided which is arranged downstream of the second exhaust-gas turbine, that is to say said exhaust-gas aftertreatment system is in turn positioned downstream in the exhaust-gas flow.

It has been recognized according to the disclosure that the temperature drop of the exhaust-gas flow as the latter passes through the exhaust-gas turbines contributes significantly to the delay in attaining a minimum exhaust-gas temperature required for the functioning of the exhaust-gas aftertreatment system. Said temperature drop can be reduced through corresponding actuation of the exhaust-gas turbines.

In a method according to the disclosure, a warm-up mode is provided for the control of the turbocharger arrangement, in which warm-up mode at least one exhaust-gas turbine is controlled so as to increase an inlet temperature of the exhaust gas before or as it enters the exhaust-gas aftertreatment system. In the warm-up mode, the turbocharger arrangement is thus controlled, through corresponding actuation of the first and/or the second exhaust-gas turbine, such that the temperature drop of the exhaust-gas flow across the exhaust-gas turbine in question is reduced and the temperature of the exhaust gas after it has passed through the exhaust-gas turbine in question is increased; in particular, the second exhaust-gas turbine, which may be designed as a low-pressure exhaust-gas turbine, is controlled such that the temperature of the exhaust gas exiting it is increased. In this way, the temperature of the exhaust gas immediately before or as it enters the exhaust-gas aftertreatment system is increased. Such a warm-up mode, which may also be referred to as catalytic converter warm-up mode or as exhaust-gas aftertreatment warm-up mode, is used in particular after a cold start, though may also be used in other situations in which the inlet temperature of the exhaust gas as it enters the exhaust-gas aftertreatment system lies below a minimum inlet temperature required for the functioning of the exhaust-gas aftertreatment system.

Since it is the case that, in a warm-up mode, at least one exhaust-gas turbine is controlled so as to increase an inlet temperature of the exhaust-gas flow as it enters the exhaust-gas aftertreatment system, it is possible to ensure that a minimum inlet temperature required for the functioning of the exhaust-gas aftertreatment system, in particular for the functioning of one or more catalytic converters, is attained more quickly. In this way, it is possible in particular for the pollutant emissions of a motor vehicle which is equipped with the internal combustion engine, the turbocharger arrangement and the exhaust-gas aftertreatment system to be reduced, in particular after a cold start. A post-injection of fuel or throttling of the internal combustion engine is generally not required for increasing the exhaust-gas temperature.

In the normal mode of the internal combustion engine, that is to say when no measures are required for increasing the temperature of the exhaust gas as it enters the exhaust-gas aftertreatment system, the exhaust-gas turbines may be controlled in a manner known per se, for example as a function of the rotational speed of the internal combustion engine and a torque demand, for example for the optimization of turbine efficiency. In this regard, reference is made by way of example to the patent application DE 10 2010 037 368.0, which is not a prior publication and which is incorporated into the present patent application by reference. Here, the turbocharger arrangement may be regulated for example as a function of a charge pressure of the internal combustion engine, which may be predefined as a setpoint value for example as a function of rotational speed and load and/or accelerator pedal position.

In contrast, during a cold start of the internal combustion engine, other aspects are normally given priority, for example exhaust-gas recirculation for reducing pollutant emissions; there is therefore initially no regulation of the turbocharger arrangement with regard to a charge pressure. In this case, the first and second exhaust-gas turbines are thus not regulated in a closed regulating loop.

In a preferred embodiment of the disclosure, the control for increasing the inlet temperature of the exhaust-gas flow as it enters the exhaust-gas aftertreatment system in the warm-up mode is realized by superimposing a disturbance variable on a control signal of at least one exhaust-gas turbine. In the warm-up mode, therefore, there is no regulation by feedback of a sensor signal; in fact, there is intervention into the control of at least one exhaust-gas turbine through the change of the control signal (feedforward) such that the temperature drop of the exhaust-gas flow as it passes through the exhaust-gas turbine is reduced, and the outlet temperature is increased. In contrast to control of the first and/or second exhaust-gas turbine on the basis for example of a setpoint torque and/or the accelerator pedal position or to ensure a desired degree of exhaust-gas recirculation, the actuation of at least one exhaust-gas turbine is changed such that the inlet temperature of the exhaust gas before or as it enters the exhaust-gas aftertreatment system is increased. This permits simple control by means of which the behavior of the internal combustion engine, in particular the response to a change in the accelerator pedal position, is not changed significantly and nevertheless the time period until the minimum inlet temperature is attained is shortened.

In a particularly preferred embodiment of the disclosure, the first exhaust-gas turbine is assigned a first bypass valve for controlling the first exhaust-gas turbine, and the second exhaust-gas turbine is assigned a second bypass valve for controlling the second exhaust-gas turbine; in the warm-up mode, the second bypass valve and therefore the second exhaust-gas turbine, which is in particular the low-pressure exhaust-gas turbine, are actuated so as to increase the inlet temperature of the exhaust gas before or as it enters the exhaust-gas aftertreatment system.

The bypass valves are arranged in a branch of the exhaust system which is parallel to the respective exhaust-gas turbine, and allow the exhaust-gas flow to bypass the turbine in question. Each bypass valve may also be formed as a valve arrangement with a multiplicity of individual valves. The bypass valve of the second, or low-pressure, exhaust-gas turbine is also referred to as a "wastegate". The first and the second bypass valve have in each case at least one open and one closed position, though can preferably also be set to a multiplicity of intermediate positions or to continuously selectable intermediate positions between the open and closed states. Continuous adjustability of the bypass valves is particularly advantageous for the actuation for increasing the exhaust-gas temperature. That part of the exhaust-gas flow which is used for driving the exhaust-gas turbines is adjusted through corresponding actuation of the bypass valves. In particular, when a bypass valve is closed, the respective turbine can be traversed by the entire exhaust-gas flow, whereas when the bypass valve is partially open, the turbine is traversed by only a partial flow, and when the bypass valve is completely open, the turbine is no longer traversed by the exhaust-gas flow or is traversed by only a very small part of the exhaust-gas flow. By setting the position of a bypass valve it is thus possible to control the rotational speed of a compressor which is driven by the exhaust-gas turbine in question, and therefore the charge pressure of the internal combustion engine. Furthermore, the position of the bypass valve determines the pressure and temperature drop of the exhaust gas as it passes through the respective stage of the exhaust system, wherein the temperature drop of the entire exhaust-gas flow downstream of the opening-in point of the parallel branch is determined from the mixture of both parts of the exhaust-gas flow, specifically that part of the exhaust-gas flow which passes through the turbine itself with that part which bypasses the turbine via the parallel branch through the bypass valve.

Since the at least one exhaust-gas turbine is controlled through the actuation of the respective bypass valve, and since it is the case in the warm-up mode that the second bypass valve is actuated so as to increase the temperature of the exhaust gas, the result is a particularly simple and effective facility for increasing the exhaust-gas temperature and for shortening the time taken until a minimum temperature for ensuring the functioning of the exhaust-gas aftertreatment system is attained.

In particular, to increase the inlet temperature of the exhaust gas before or as it enters the exhaust-gas aftertreatment system in the warm-up mode, the second bypass valve is opened further than would correspond, for example, to an accelerator pedal position or a desired degree of exhaust-gas recirculation. In this way, in any case, an increase of the outlet temperature of the exhaust gas as it exits the respective stage of the exhaust system, and therefore of the inlet temperature at the inlet into the exhaust-gas aftertreatment system, is attained. The second bypass valve may for example be fully opened in order to attain a particularly effective increase in the inlet temperature of the exhaust-gas flow as it enters the exhaust-gas aftertreatment system.

Furthermore, it is advantageously possible in the warm-up mode for the first exhaust-gas turbine, which is designed in particular as a high-pressure turbine, to be controlled so as to attain a setpoint charge pressure of the internal combustion engine and/or, if the internal combustion engine has exhaust-gas recirculation, a setpoint exhaust-gas recirculation flow. In particular, the first bypass valve may be actuated for this purpose. For such control, a closed regulating loop is not necessary; in fact, a corresponding control signal for controlling the first exhaust-gas turbine may be generated for example on the basis of rotational speed and torque demand and/or accelerator pedal position, wherein a mathematical model of the internal combustion engine may be used as a basis. A corresponding actuation of the first exhaust-gas turbine or of the first bypass valve may be realized in the form of feedforward control. In this way, it is possible with particularly simple control of the first exhaust-gas turbine to attain adequate response behavior of the internal combustion engine, even if the second exhaust-gas temperature is actuated so as to increase the exhaust-gas temperature.

In an embodiment of the disclosure, the warm-up mode is started on the basis of a cold start signal. For this purpose, it is for example possible to use a signal of a temperature sensor, for example of a sensor which measures a temperature of the coolant of the internal combustion engine. If the coolant temperature lies below a predefinable threshold value, it is assumed upon starting of the internal combustion engine that a cold start is taking place, and the cold start signal is triggered. In addition to the coolant temperature, an outside temperature may also be determined, and the cold start signal triggered if the difference between the coolant temperature and outside temperature lies below a predefinable threshold value. In this way, on the basis of the signal from sensors which are generally provided for other systems and regulating arrangements, it is possible to attain an adequately precise determination of internal combustion engine operating situations in which, as per the method according to the disclosure, the described measures for increasing the temperature of the exhaust gas as it enters the exhaust-gas aftertreatment system are implemented.

Instead of or in addition to one or more temperature signals, the time period which has elapsed since the last period of operation of the internal combustion engine may also be used for triggering a cold start signal. Said time period may be determined on the basis of data available within an electronic engine controller, and used for an alternative, or together with one or more temperature signals, even more precise, determination of a cold start situation.

It is furthermore preferable for the warm-up mode to be ended on the basis of a temperature signal. It may be provided in particular that the warm-up mode is ended and a transition is made to the normal mode of the turbocharger arrangement when the coolant of the internal combustion engine has reached a predefined temperature. In this way, adequately precise determination of an end of a warm-up phase and thus of the attainment of a minimum inlet temperature of the exhaust gas as it enters the exhaust-gas aftertreatment system is generally possible without an additional temperature sensor. To increase the accuracy of the temperature determination, it is possible for a signal from an exhaust-gas temperature sensor to alternatively or additionally be evaluated, which sensor, to determine a temperature of the exhaust-gas flow, may advantageously be arranged in the vicinity of the point at which the exhaust-gas flow enters the exhaust-gas aftertreatment system.

A time signal may alternatively or additionally be used for ending the warm-up mode. The warm-up mode may therefore be ended for example after a predefined time period has elapsed since the cold start of the internal combustion engine, that is to say since the start of the warm-up mode. The time period may typically last a number of minutes. A particularly simple and fail-safe implementation of the method according to the disclosure is possible in this way. It may particularly advantageously be provided that the warm-up mode is ended when a predefined minimum temperature of the coolant or of the exhaust gas is reached, but at the latest after a predefined time period. A further increased level of reliability is hereby attained in the implementation of the method according to the disclosure.

A control device according to the disclosure for a turbocharger arrangement of an internal combustion engine has in particular a processor or similar device for determining and generating control signals for controlling at least the first and the second exhaust-gas turbine on the basis of input signals, for example the rotational speed of the internal combustion engine and/or an accelerator pedal position in a motor vehicle. The control device comprises corresponding inputs for receiving the input signals and if appropriate for receiving signals from one or more temperature sensors, for example a coolant temperature sensor. Furthermore, the control device comprises outputs for the actuation of the exhaust-gas turbines, in particular of bypass valves of a high-pressure turbine and of a low-pressure turbine and if appropriate of further control elements of the turbocharger arrangement, such as a compressor bypass valve. According to the disclosure, the control device is set up for implementing the above-described method for controlling the turbocharger arrangement. The control device may in particular be part of an electronic engine controller.

Turning to FIG. 1, an internal combustion engine 1, which may be for example an applied-ignition engine or a diesel engine, has a turbocharger arrangement 2 which comprises a high-pressure turbocharger 3 and a low-pressure turbocharger 4. Arranged in the exhaust system 5 of the internal combustion engine 1 is a high-pressure turbine 6 which, via a shaft 7, drives a high-pressure compressor 8 in the charge-air system 9 of the internal combustion engine 1. Arranged in the exhaust system 5 downstream of the high-pressure turbine 6 is a low-pressure turbine 10 which, via a shaft 11, drives a low-pressure compressor 12. In general, the turbine and compressor of the high-pressure turbocharger 3 are of smaller dimensions than the turbine and compressor of the low-pressure turbocharger 4, as indicated in FIG. 1.

The high-pressure turbine 6 is assigned a first bypass valve 13 (also referred to as "turbine bypass valve", TBV), the complete or partial opening of which causes a bypass to be created through which the exhaust-gas flow entirely or partially bypasses the high-pressure turbine 6. The drive of the high-pressure turbine 6 and therefore of the high-pressure turbocharger 3 can therefore be controlled by means of the setting of the first bypass valve 13. Correspondingly, the low-pressure turbine 10 is assigned a second bypass valve 14 ("waste gate", WG), by the setting of which the low-pressure turbocharger 4 can be controlled.

An exhaust-gas aftertreatment system 18 is arranged downstream of the low-pressure stage of the turbocharger arrangement 2, that is to say downstream of the opening-in point of the parallel branch with the second bypass valve 14 (WG) for bypassing the low-pressure turbine 10. Said exhaust-gas aftertreatment system may comprise for example a diesel oxidation catalytic converter and/or a $NO_x$ absorber (Lean $NO_x$ Trap, LNT) and/or further filters or catalytic converters. The exhaust-gas flow thus passes firstly through the high-pressure stage of the turbocharger arrangement 2, that is to say the high-pressure turbine 6 and/or the first bypass valve 13 (TBV), subsequently through the low-pressure stage with the low-pressure turbine 10 and the second bypass valve 14 (WG), and then passes in the direction of the arrow into the exhaust-gas aftertreatment system 18. The temperature of the exhaust-gas flow as it arrives at the inlet of the exhaust-gas aftertreatment system 18 is a significant influential variable for the functioning of the exhaust-gas aftertreatment system 18, because the functioning of the catalytic converters and of the further components contained therein is dependent on temperature. Within the exhaust-gas aftertreatment system 18, the temperature of the exhaust-gas flow may vary further owing to the chemical and physical processes taking place therein. After passing through the exhaust-gas aftertreatment system 18, the exhaust-gas flow, the pollutants of which have been reduced, passes into the ambient air (not illustrated).

The charge air flows in the direction of the upwardly pointing arrow, firstly through the low-pressure compressor 12, and can subsequently flow through the high-pressure compressor 8 or bypass the latter by a bypass which is opened and closed by means of a compressor bypass valve 15, before the charge air is supplied, through the optional charge-air cooler 16, to the internal combustion engine 1. The charge-air flow or the charge pressure may be measured by means of a sensor 17 illustrated symbolically in FIG. 1.

An optionally present exhaust gas recirculation (EGR) system is depicted in FIG. 1. The EGR system diverts a portion of the exhaust gases back to the intake. In one embodiment, the EGR system may include an EGR passage 20 arranged to divert the exhaust after traveling by the high and low pressure turbines and inject it into the intake passage prior to the low pressure compressor. In other embodiments, an EGR passage may be arranged before either the high or low pressure turbines and inject the exhaust into the intake passage after the high and low pressure compressors, such as the high-pressure EGR passage 21. However, any suitable EGR arrangement is within the scope of this disclosure.

A control system 22 may activate the turbocharger system. The control system 22 includes, in particular, a processor 24 for determining the positions of the bypass valves according to various inputs, a memory 26, and a control unit 28 for activating the bypass valves according to the positions determined, the processor 24 being set up to execute the methods described herein, which may be stored in the memory 26. In addition, the control system 22 includes suitable inputs 30 for capturing input variables, such as the rotational speed and the load of the internal combustion engine, the inlet and outlet pressures of the high pressure and the low pressure turbine and/or the rotational speeds of the high pressure and the low pressure turbine. Furthermore, the control system 22 includes outputs 32 for activating the bypass valves of the high pressure and the low pressure turbine, and optionally of a third bypass valve and/or further actuating elements. The control system 22 may be, in particular, a part of an electronic engine management system.

Figure 2:
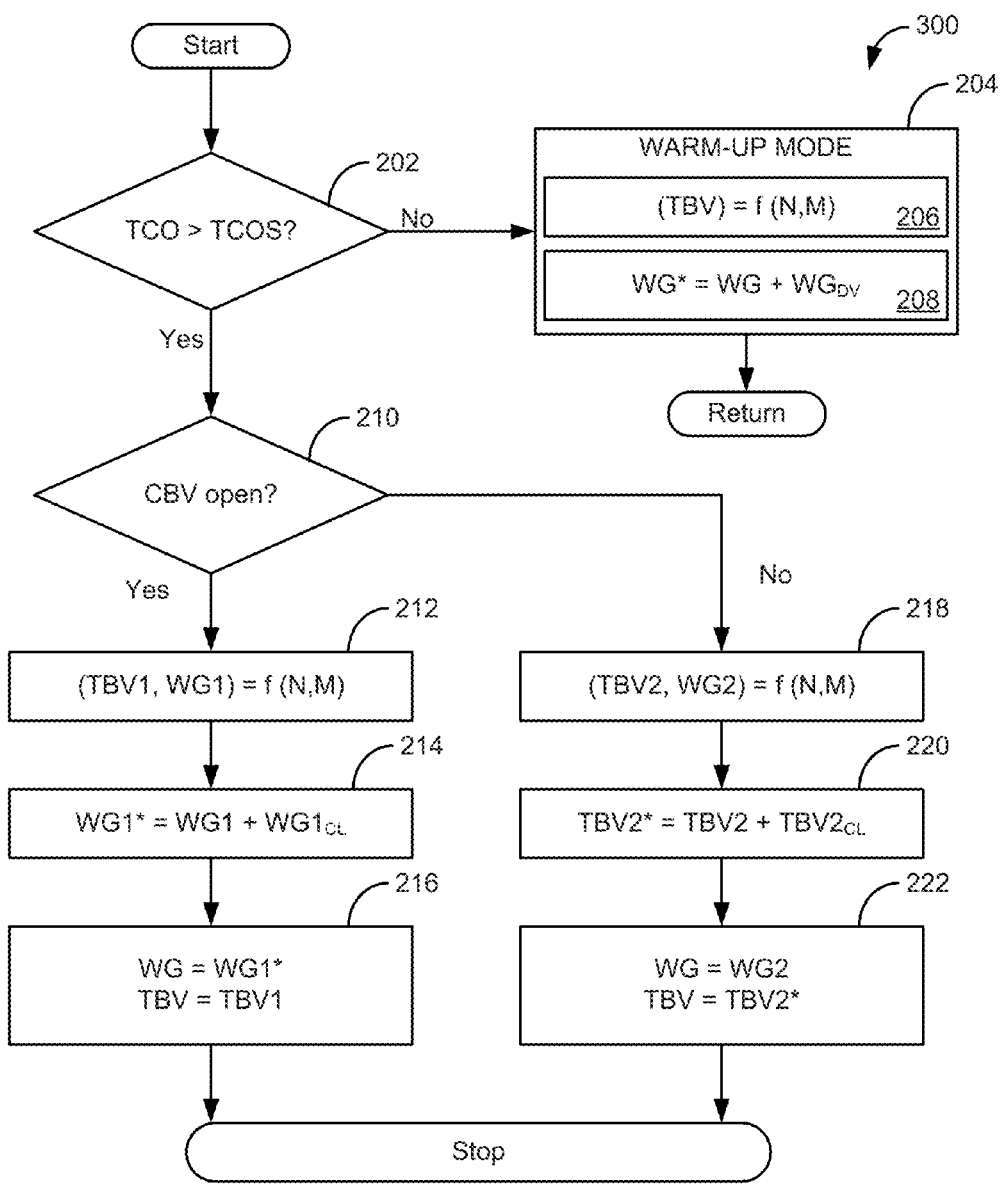
FIG. 2 shows a flow diagram illustrating the process sequence of an exemplary embodiment of the method according to the disclosure.

As shown in FIG. 2, in one exemplary embodiment of a method 200 according to the disclosure, during or after a start of the internal combustion engine, a signal from a coolant sensor is firstly evaluated at 202 to determine whether the temperature TCO of the coolant of the internal combustion engine lies above a threshold value $TCO_S$, which is selected such that a cold start situation or the end of a warm-up phase of the internal combustion engine can be identified in this way. If the temperature TCO lies below the threshold value $TCO_S$, it is assumed that a cold start is taking place, and a warm-up mode is selected for the control of the turbocharger arrangement at 204.

In the warm-up mode, the first bypass valve 13 (TBV) is controlled in an open regulating loop at 206 for controlling the charge pressure of the internal combustion engine, for example on the basis of the rotational speed of the internal combustion engine and the torque demand, determined for example from the accelerator pedal position, and/or a set-point torque. The second bypass valve 14 (WG) is likewise operated in an open regulating loop at 208 and actuated so as to increase the temperature of the exhaust-gas flow downstream of the outlet from the low-pressure exhaust-gas turbine 10 and from the second bypass valve 14. For this purpose, a control signal which corresponds to a position setting of the second bypass valve 14 (WG) determined on the basis of other requirements, for example for the operation of the low-pressure compressor 12, has superposed on it a disturbance variable ($WG_{DV}$) which leads to the second bypass valve 14 being opened to a greater extent (WG*). In this way, the exhaust-gas partial flow passing through the second bypass valve 14 is increased, and the temperature drop of the entire exhaust-gas flow as it passes through the low-pressure stage, composed of low-pressure exhaust-gas turbine 10 and second bypass valve 14, of the exhaust system 5 is reduced. In this way, the inlet temperature of the exhaust-gas flow as it enters the exhaust-gas aftertreatment system 15 can be increased. The reduced drive of the low-pressure exhaust-gas turbine 10 and the resulting reduced effect of the low-pressure compressor 12 generally do not have a significant adverse effect on the response behavior of the internal combustion engine 1.

Owing to the operation of the internal combustion engine 1, the temperature TCO of the coolant gradually increases. By means of a cyclic interrogation of the signal of the coolant sensor, it is determined whether the conditions for the implementation of the warm-up mode remain present. When the coolant temperature TCO has reached the threshold value $TCO_S$, the warm-up mode is ended and a transition is made back to the normal mode of the turbocharger arrangement.

In the normal mode, it is for example possible to resort to a mathematical model stored in a control device, and to determine an optimum position of the two bypass valves as a function of input variables, for example the engine rotational speed and a setpoint torque. Here, it is additionally possible for an optimization to take place by means of regulation of the position of in each case one bypass valve in a closed regulating loop taking into consideration the charge pressure. It is thus possible, for example at low rotational speed and/or at low load, for the position of the first bypass valve of the internal combustion engine to be regulated as a function of the charge pressure, whereas at higher rotational speed and/or higher load of the internal combustion engine, the second bypass valve serves for regulating the charge pressure. A corresponding method for controlling a turbocharger arrangement is described for example in the abovementioned DE 10 2010 037 368.0 and described below. The normal mode for the control of the turbocharger arrangement may be maintained until the internal combustion engine is shut down.

As shown in FIG. 2, an optimization may additionally be effected by controlling the position of one bypass valve in each case in a closed control loop, while including the charge pressure. At 210 of the method 200 represented in FIG. 2, it is determined whether the third bypass valve 15 (CBV) associated with the high pressure compressor 8 is open or closed. This valve may be, for example, pressure-actuated and indicates by its position whether a condition of relatively high rotational speed or relatively high load (CBV open), or a condition of low rotational speed or low load (CBV closed) is present. Depending on the position of the third bypass valve 15 a first or a second branch of the method is run.

In both branches an efficiency-based determination of the position of the first bypass valve (TBV) 13 and of the second bypass valve (WG) 14 as a function of engine speed and load is first carried out at 212 and 218. If the third bypass valve 15 is open (e.g. the answer the question at 210 is Yes), according to a first branch of the method 200 at 214, the second bypass valve 14 associated with the low pressure turbine 10 is used to control the charge pressure, in that a correction value $WG1_{CL}$ (closed loop) is added to the value WG1 determined in 214, on the basis of a value of the charge pressure set-point error determined by the sensor 17 (e.g., the difference between the desired, set-point charge pressure and the measured charge pressure). Next, at 216, the second bypass valve 14 is activated according to the value WG1* determined likewise. The first bypass valve 13 is activated according to the previously determined value TBV1.

In the second branch of the method 200, which is run in the case of the closed position of the third bypass valve 15 (CBV) determined at 210, the first bypass valve 13 is used in a corresponding manner for the charge pressure control loop, in that the value TBV2 determined in 218 is corrected by a correction value $TBV2_{CL}$ determined on the basis of the charge pressure set-point error at 220, before the first and second bypass valves 13, 14 are activated accordingly at 222. The method is then ended or repeated.

That is, the first and second bypass valves (TBV and WG) may have a set position that is determined as a function of engine speed and load, for example. Then, under a first condition when engine speed and load are relatively high, the third bypass valve (CBV) may be open, and the position of the second bypass valve may be adjusted in order to maintain charge pressure at a desired level. Further, the second bypass valve position may be adjusted so that engine load is maintained. The first bypass valve may be maintained at the original set position. Under a second condition when engine speed and load are low, the third bypass valve may be closed and the position of the first bypass valve may be adjusted to maintain charge pressure and engine load at desired levels, while maintaining the second bypass valve at the original set position.

Further, in some embodiments the switch point at 210 may be a function of speed and load, which would lead to a different repartition of the closed loop terms $WG1_{CL}$ and $TBV2_{CL}$.

In this way, under certain conditions, adjustments to the turbocharger system to achieve a desired level of charge pressure may be made by adjusting the position of the first bypass valve, while under other conditions, the desired level of charge pressure may be maintained by adjusting the second bypass valve. Further, during warm up mode, in order to rapidly heat the catalyst, the first bypass valve may commanded to a position determined based on speed and load, while the second bypass valve may be commanded to a position determined based on catalyst temperature. Therefore, the desired charge pressure may be maintained while operating the turbines at a high level of efficiency across various operating conditions of the engine.

The above-described method and system provide for an engine method comprising during a first condition, controlling a position of a first turbine bypass valve of a high-pressure turbine based on engine speed and load, and controlling a position of a second turbine bypass valve of a low-pressure turbine based on catalyst temperature, and during a second condition, controlling the position of the first bypass valve based on boost pressure and controlling the position of the second bypass valve based on engine speed and load.

The method may include during a third condition, controlling the position of the second bypass valve based on boost pressure and controlling the position of the first bypass valve based on engine speed and load. The first condition may include catalyst temperature below a first threshold, the second condition may include catalyst temperature above a first threshold and boost pressure below a second threshold, and the third condition may include catalyst temperature above the first threshold and boost pressure above the second threshold. The boost pressure threshold (e.g., the second threshold) may be the amount of boost pressure above which the compressor bypass valve (CBV) is configured to open.

Another example method provided herein comprises determining respective set positions of a first bypass valve of a high pressure turbine and a second bypass valve of a low pressure turbine; under a first condition, adjusting a position of the second bypass valve away from the set position to increase catalyst temperature; and under a second condition, adjusting a position of the first bypass valve away from the set position to maintain charge pressure and engine load. The method may include under the first condition, maintaining the first bypass valve at the set position for the first bypass valve; and under the second condition, maintaining the second bypass valve at the set position for the second bypass valve. The method includes under a third condition, adjusting a position of the second bypass valve away from the set position to maintain charge pressure and engine load.

The first condition may comprise catalyst temperature below a threshold, the second condition may comprise a third bypass valve of a high pressure compressor being closed, and the third condition comprises a third bypass valve of a high pressure compressor being open. The third bypass valve may be open during high speed and high load conditions and may be closed during low speed and low load conditions. The set positions of the first and second bypass valves may be determined as a function of engine speed and load.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a turbocharger arrangement of an internal combustion engine, the turbocharger arrangement having at least a first exhaust-gas turbine and a second exhaust-gas turbine arranged downstream of the first, and an exhaust-gas aftertreatment system being arranged downstream of the second exhaust-gas turbine, comprising:
   in a warm-up mode, controlling the first exhaust-gas turbine to attain a setpoint charge pressure of the internal combustion engine, including controlling an amount of exhaust gas through the first exhaust-gas turbine and an amount of exhaust gas through a first bypass of the first exhaust-gas turbine, and further including controlling an amount of intake air through a compressor coupled to the first exhaust-gas turbine as a function of an engine system pressure;
   during the warm-up mode, controlling the second exhaust-gas turbine so as to increase an inlet temperature of an exhaust-gas flow at an inlet into the exhaust-gas aftertreatment system, including controlling the amount of exhaust gas from the first exhaust-gas turbine and the first bypass through the second exhaust-gas turbine and through a second bypass of the second exhaust-gas turbine, the second bypass having an inlet downstream of an outlet of the first bypass and downstream of an outlet of the first exhaust-gas turbine;
   during a normal mode, controlling the first exhaust-gas turbine and the second exhaust-gas turbine as a function of an amount of intake air bypassing the compressor; and
   flowing exhaust-gas recirculation (EGR) through an EGR passage having an inlet upstream of the first exhaust-gas turbine, and in the warm-up mode, the first exhaust-gas turbine is further controlled so as to attain a setpoint EGR flow, the exhaust gas through the first bypass also bypassing the EGR passage.

2. The method as claimed in claim 1, wherein controlling the second exhaust-gas turbine to increase the inlet temperature in the warm-up mode further comprises superimposing a disturbance variable on a control signal of the second exhaust-gas turbine.

3. The method as claimed in claim 1, wherein the first bypass of the first exhaust-gas turbine includes a first bypass valve for controlling the first exhaust-gas turbine, and the second bypass of the second exhaust-gas turbine includes a second bypass valve for controlling the second exhaust-gas turbine, and wherein in the warm-up mode, the second bypass valve is controlled so as to increase the inlet temperature.

4. The method as claimed in claim 3, wherein the second bypass valve is opened further or completely in order to increase the inlet temperature.

5. The method as claimed in claim 1, wherein the warm-up mode is started on the basis of a cold start signal and is ended on the basis of a temperature signal or a time signal.

6. The method as claimed in claim 3, wherein the compressor includes a third bypass controlled by a third bypass valve, and wherein controlling the first exhaust-gas turbine and the second exhaust-gas turbine as a function of the amount of intake air bypassing the compressor comprises controlling the first exhaust-gas turbine and the second exhaust-gas turbine as a function of a position of the third bypass valve.

7. The method as claimed in claim 6, wherein controlling the first exhaust-gas turbine and the second exhaust-gas turbine as a function of the position of the third bypass valve comprises:
   determining a first position of the first bypass valve and a second position of the second bypass valve as a function of engine speed and load;
   responsive to the third bypass valve being fully closed, adjusting the first position of the first bypass valve using a first correction value determined as a function of charge pressure; and
   responsive to the third bypass valve being open, adjusting the second position of the second bypass valve using a second correction value determined as a function of charge pressure.

8. A control device for a turbocharger arrangement of an internal combustion engine, wherein the control device is set up for carrying out the method according to claim 1.

9. A method, comprising:
   during a first condition, controlling a first bypass valve of a high-pressure turbine based on engine speed and load, controlling a second bypass valve of a low-pressure turbine based on catalyst temperature, and actuating a third bypass valve of a high-pressure compressor as a function of an engine system pressure;
   during a second condition and responsive to the third bypass valve fully closing, controlling the first bypass valve based on boost pressure and controlling the second bypass valve based on engine speed and load; and flowing exhaust-gas recirculation (EGR) through an EGR passage having an inlet upstream of the high-pressure turbine, and during the first condition, the first bypass valve is further controlled so as to attain a setpoint EGR flow, exhaust gas bypassing the high-pressure turbine via the first bypass valve also bypassing the EGR passage.

10. The method of claim 9, wherein the first condition comprises catalyst temperature below a threshold and the second condition comprises catalyst temperature above the threshold, and wherein controlling the first bypass valve based on boost pressure comprises adjusting the first bypass valve away from a setpoint position based on a difference between desired boost pressure and measured boost pressure.

11. The method of claim 9, further comprising, during the second condition and responsive to the third bypass valve opening, controlling the second bypass valve based on boost pressure and controlling the first bypass valve based on engine speed and load, and wherein controlling the second bypass valve based on boost pressure comprises adjusting the second bypass valve away from a setpoint position based on a difference between desired boost pressure and measured boost pressure.

12. A turbocharger method, comprising:
determining respective set positions of a first bypass valve of a high-pressure turbine and a second bypass valve of a low-pressure turbine;
under a first condition, adjusting a position of the second bypass valve away from the set position to increase catalyst temperature;
under a second condition and responsive to a third bypass valve of a high-pressure compressor being closed, adjusting a position of the first bypass valve away from the set position to maintain charge pressure and engine load while maintaining the second bypass valve at the set position for the second bypass valve;
responsive to a third condition including the third bypass valve being open, adjusting a position of the second bypass valve away from the set position by an amount based on charge pressure and engine load while maintaining the first bypass valve at the set position for the first bypass valve; and
flowing exhaust-gas recirculation (EGR) through an EGR passage having an inlet upstream of the high-pressure turbine, and under the first condition, the position of the first bypass valve is controlled so as to attain a setpoint EGR flow, exhaust gas bypassing the high-pressure turbine via the first bypass valve also bypassing the EGR passage.

13. The method of claim 12, wherein the first condition comprises catalyst temperature below a threshold.

14. The method of claim 12, wherein the third bypass valve is open during high speed and high load conditions and is closed during low speed and low load conditions.

15. The method of claim 12, wherein the set positions of the first and second bypass valves are determined as a function of engine speed and load.

16. The method of claim 12, further comprising under the third condition, maintaining the first bypass valve at the set position for the first bypass valve.

* * * * *